United States Patent Office 2,969,005
Patented Jan. 24, 1961

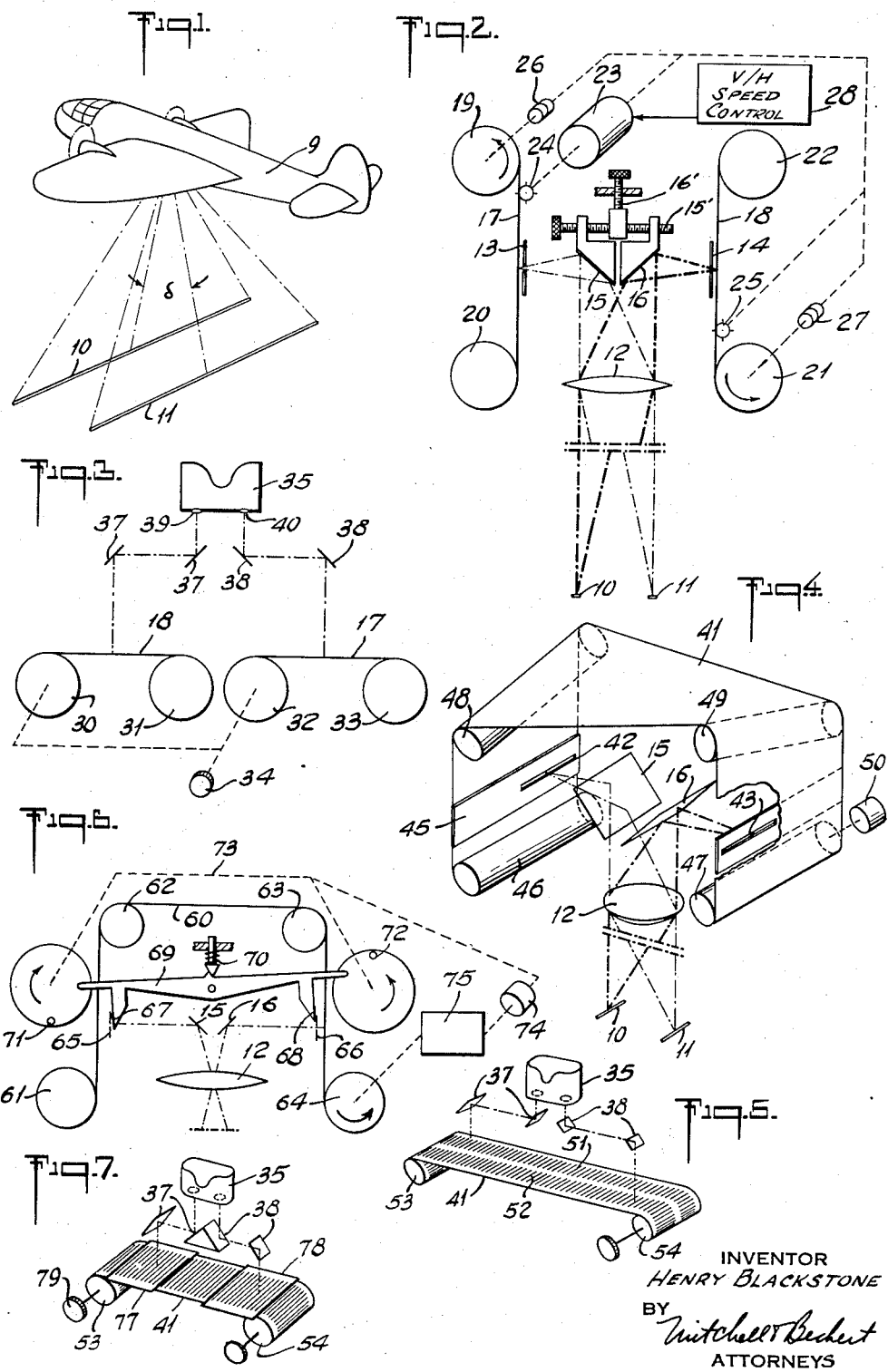

2,969,005

STEREO STRIP CAMERA

Henry Blackstone, Syosset, N.Y., assignor to Servo Corporation of America, New Hyde Park, N.Y., a corporation of New York Original application Sept. 27, 1954, Ser. No. 458,301, now Patent No. 2,929,305, dated Mar. 22, 1960. Divided and this application Oct. 2, 1958, Ser. No. 764,917

7 Claims. (Cl. 95—12.5)

My invention relates to aerial photography, and in particular to strip photography, that is, to airborne cameras in which an optical slit (near the focal plane of the focusing optics and effectively extending transversely of the aircraft) is caused to scan a transverse line on the ground, by continuously moving a strip of film behind the slit. This application is a division of my copending application Serial No. 458,301, filed September 27, 1954, now Patent No. 2,929,305, issued March 22, 1960.

It is an object to provide an improved camera of the character indicated.

It is another object to provide an improved stereoptically recording aerial strip camera.

It is still another object to provide an improved stereoptical camera utilizing but one focusing optical system.

It is also an object to provide viewing means for recordings produced by stereoptical cameras meeting the above objects.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

Fig. 1 is a simplified rear three-quarter perspective view of a reconnaissance aircraft, together with a geometrical representation of the optical response of cameras of the invention;

Fig. 2 is a diagrammatic representation of optical and mechanical elements of a camera incorporating features of the invention;

Fig. 3 is an optical diagram of a viewer for records produced with the camera of Fig. 2;

Figs. 4 and 6 are diagrammatic perspective and side views of two alternative cameras according to the invention; and Figs. 5 and 7 are perspective views of viewers, for records produced by the respective cameras of Figs. 4 and 6.

Briefly stated, my invention contemplates the production of stereoptically viewable images with a strip camera of the type employed for aerial reconnaissance. The stereoptically produced records may be made by two appropriately synchronized strip cameras of conventional construction, but with the arrangements presently shown a single focusing optical system serves to produce both stereoptically viewable images. In one general form, the two sets of images are created on separate strips of film, driven of course at the same rate of speed through suitably synchronized mechanisms. In the other general form, both records are made on the same single strip of film; on the same strip, the records may be side-by-side or interlaced.

Referring to Fig. 1 of the drawings, my invention is seen to be applicable to the separate recording of strip images produced by scanning simultaneously (or effectively simultaneously) on response lines 10—11, spaced from each other by the separation angle δ, as measured in the vertical plane including the flight axis of a reconnaissance or other aircraft 9. The scan lines 10—11 preferably extend transversely of the true flight axis, and, therefore, it will be understood that my camera may be accommodated in a suitable stabilizing mount with provision for drift-angle (sometimes known as yaw or crab) correction, although these mechanisms are not shown.

In the form shown in Fig. 2, my camera comprises a single focusing optical system schematically indicated merely by the lens 12 and having as axis of optical symmetry located preferably between the oblique response axes for the separate scan-response lines 10—11. Separate response to the lines 10—11 is achieved by means of two optical slits 13—14 effectively in or near the focal plane of the optics 12. For convenience of mechanical construction, I employ folding elements such as inclined mirrors 15—16 for dividing light collected by the lens 12 into two separate halves. The inclination and offset position of mirror 15 is such that the oblique axis in which slit 13 is located will determine response to line 11 (light phantom lines). Similarly, the inclination and offset position of mirror 16 is such as to place the slit 14 on the oblique axis determining response to line 10 (heavy phantom lines). Suitably responsive film strips 17—18 may be supported behind the respective slits 13—14, and take-up and supply reels 19—20 for the film 17 (and 21—22 for the film 18) may be provided. I show a variable speed motor 23 directly driving film-advancing means 24—25 for the respective strips of film, and, to insure proper take-up, the same motor 23 may, through slip clutches 26—27, drive the respective takeup reels 19—21.

In order to preserve proper dimensional proportions in the ultimately developed images, provision is made at 28 for control of the speed of motor 23 in accordance with the velocity-altitude (or V/H) rate of the aircraft. This control may be operated manually after having made visual or other observations to determine the V/H rate; alternatively, V/H-responsive devices (as described in my copending application, Serial No. 444,990, filed July 22, 1954, now Patent No. 2,878,711), may be employed at 28.

In operation, the continuously moving film 17 will develop a continuous record of the terrain scanned through slit 13 along line 11, and the film 18 will develop a similar record for viewing through slit 14 along line 10. On completion of a reconnaissance survey, the separate strips of film may be developed and inserted in a viewer, as suggested in the diagram of Fig. 3.

In the viewer of Fig. 3, separate take-up and supply reels 30—31 for the strip 18, and 32—33 for the strip 17, are provided; and support for the instantaneously viewed sectors of the respective film strips is preferably such that these sectors are in the same plane, as shown. A single means 34 may be employed in conjunction with both take-up reels 30—32, to assure synchronized film advancement for viewing purposes. At a viewing location 35, the images of both film strips 17—18 are brought together by suitable folding elements 37—38 in conjunction with viewing lenses 39—40 at substantially interoccular spacing. Of course, in setting the film strips 17—18 on their respective supports and reels, the stereoptical effect will not be achieved for images that were simultaneously exposed, but one film strip must be loaded in slightly advanced relation with the other so that ground-scanned areas coincide for stereoptically registered viewing, as will be understood. Once stereoptical registry has been achieved, then a mere simple advance of both films by the means 34 will assure constant synchronism of stereoptical alignment.

As a further feature of the construction of Fig. 2, the mirrors 15—16 may be mounted for lateral adjustment by means of the differential screw 15', or for longitudinal adjustment (toward and away from the optics 12) by means of the screw 16'. Either of these adjustments will serve to spread or narrow the separation angle δ and will therefore image more widely spaced (or less widely spaced) scan lines 10—11 at slits 13—14. Adjustment of the angle δ may achieve variously exaggerated stereoptical effects, as may be useful for particular types of reconnaissance missions.

In the camera of Fig. 4, I illustrate that a single strip of film 41 may be exposed to light passing both slits 42—43 of a camera otherwise resembling that described in connection with Fig. 2. In other words, the camera may comprise a single optical system 12 with folding mirrors 15—16 serving the respective slits 42—43 and corresponding to ground-scanned lines 11—10, as previously described. In order to place both images on the strip of film 41, I provide mask 45, in which the slit 42 is formed essentially on one half thereof so that the record produced through slit 42 will be along a particular half of the film 41. The film is supplied from a supply reel 46 and is accumulated on a take-up reel 47. These reels 46—47 are offset from each other, the reel 46 being offset on one side of the vertical plane including the flight axis, and the other reel 46 being offset on the other side of said plane. The rollers 48—49 may be oppositely inclined (as shown) in order to develop a twist in the film and so that the film may be continuously and smoothly payed from one offset location to the other. In the offset position created by roller 49, the film 41 is oriented to place the unexposed half thereof behind the slit 43, which may be formed as for the case of the slit 42, but with a mask portion to cover the previously exposed half of the film. The means 50 will be understood to suggest drive means, as shown at 23—24—26—28 in Fig. 2, to assure continuous film advancement in accordance with the V/H rate of the aircraft.

In operation, two strip records are created side-by-side on the film 41. On one side is a succession of images 51 created by scanning (exposure) through slit 42, and on the other side are the images 52 created by scanning (exposure) through slit 43. These separate images may be simultaneously viewed, without concern for synchronism of film advancement, in a viewer such as that shown in Fig. 5. The viewer of Fig. 5 is seen to require only a single supply reel 53, and take-up and advance mechanism 54. The viewer may be otherwise as described at 35 in Fig. 3 and has, therefore, been given the same reference numerals. The folding elements 37—38 will be understood to spread the viewing axes by an amount sufficient to permit stereoptical register of the longitudinally and laterally spaced images to be viewed, as will be understood.

In Fig. 6, I show a further modified camera, again employing a single optical element 12 with folding elements 15—16, and serving a single continuously driven strip of film 60. The film 60 is supplied from a reel 61 and payed over idler pulleys 62—63 to a take-up reel 64. On one folded side of the optics, the film 60 traverses the slit 65, and on the other side of the optics, film 60 traverses the slit 66. Both slits 65—66 may be substantially the width of the film and, in order to avoid double exposure, I resort to line-interlace techniques.

Line interlace may be achieved by shutter means periodically interrupting light to the slits 65—66, respectively. In the form shown, the shutter comprises two blades 67—68 on opposite ends of a rocking beam 69, and detent means 70 serve resiliently to retain the alternate shutter positions. To shift the shutter, I show continuously rotating trip pins 71—72 ganged, as suggested by the dashed lines 73, and continuously driven by motor means 74, which may be the same motor as that employed through reduction gearing 75 (to take-up means 64) to advance the film. For the form shown, the trip pins 71—72 alternately intercept projecting lugs on the beam 69, and the result is to create successions of narrow-line exposures on the film 60 through the respective slits 65—66. By properly relating the length along film 60 between slits 65—66 to the exposure periods created by intermittent shutter action, and to the film-advance speed, the exposures due to slit 65 will be interlaced with those due to slit 66, and maximum use may be made of the film 60.

The recorded image on film 60 will be unintelligible except through proper viewing means suggested in Fig. 7. To the extent that the viewer of Fig. 7 resembles that of Fig. 5, it has been given the same reference characters. However, to segregate one set of interlaced lines from the other, I employ suitable masks or grids 77—78. The masks 77—78 may be merely transparent material ruled with opaque lines of width and spacing corresponding to the lines created by individual shutter action, described in connection with Fig. 6, and the register of masks on the film 41 should be such that one mask passes only the images through one slit, while the other mask passes only the images produced by the other slit. The stereoptical viewing effect will not be continuously apparent as the advancing mechanism is operated; but at any general location on the strip record, a differential manipulation of reverse-wind means 79 and of advancing means 54 will readily serve to position the film for stereoptical viewing.

It will be seen that I have described an ingenious aerial-reconnaissance camera which may be useful in creating substantially improved recorded intelligence without adding the bulk that would be involved in employing two cameras and synchronizing mechanism for interconnecting such cameras. Actually, the bulk of the camera, as described herein, need be little different from that of a conventional strip camera.

While I have described the invention in detail for the preferred forms shown, it will be understood that modifications may be made within the scope of the invention as defined in the claims which follow.

I claim:

1. An aerial strip camera, comprising a single focusing optical system with a central axis of symmetry, two duplicate mirrors on opposite sides of said axis for folding oblique parts of the response of said optical system on opposite sides of said axis, a slit near the focal plane on one folded side of said axis, a second slit near the focal plane on the other folded side of said axis, two strips of film supported for response to light passing said respective slits, and film-advancing means continuously driving said film with a movement transverse to the orientation of said slits.

2. A camera according to claim 1, including means for adjustably laterally positioning said mirrors with respect to said axis, whereby the width of the base for stereo recording may be adjusted.

3. A camera according to claim 1, including means for adjustably longitudinally positioning said mirrors along said axis toward and away from said optical system, whereby the width of the base for stereo recording may be adjusted.

4. A camera according to claim 1, in which said film-advancing means comprises a variable-speed motor directly driving said film at the same speed past both said slits, and means for varying said speed in accordance with the V/H rate of an aircraft.

5. An aerial strip camera, comprising a single focusing optical system having a central axis of optical symmetry, two inclined mirrors symmetrically positioned with respect to said axis and serving to fold in opposite directions and away from each other two obliquely inclined axes in said system, means for adjustably positioning said mirrors with respect to said optical system, a first slit on one of said obliquely inclined axes and near the focal plane, a second slit on the other of said obliquely inclined axes and near the focal plane, film-supporting means including means for supporting a first length of film for response to light passing one of said slits and means for supporting a second length of film for response to light passing the other of said slits, and means for continuously advancing such film lengths past both slits at the same rate.

6. Aerial strip-camera means, comprising a single optical system providing two angularly separated optical axes, means orienting said axes substantially in the vertical plane including a flight axis of an aircraft, separate mirrors continuously folding said axes away from each other and in generally opposite directions, a first slit effectively in the focal plane for one of said folded axes and oriented to image scan lines extending transversely of said vertical plane, a second slit effectively in the focal plane for the other of said folded axes and oriented to image scan lines extending transversely of said vertical plane, film-supporting means including means for supporting a first length of film for response to light passing one of said slits and means for supporting a second length of film for response to light passing the other of said slits, means for advancing said film lengths past said respective slits at substantially the same speed, and selectively adjustable means for symmetrically adjusting said separate mirrors with respect to each other and with respect to said single optical system.

7. The strip-camera means according to claim 6, wherein said film-supporting means comprises respective supply reels and respective take-up reels for said first and second lengths of film.

References Cited in the file of this patent

UNITED STATES PATENTS

| | | |
|---|---|---|
| 1,084,492 | Schwab | Jan. 13, 1914 |
| 2,433,534 | Sonne | Dec. 30, 1947 |
| 2,593,088 | Baker | Apr. 15, 1952 |